US009873092B2

(12) United States Patent
Yang et al.

(10) Patent No.: US 9,873,092 B2
(45) Date of Patent: Jan. 23, 2018

(54) MEMBRANE FOR FILTRATING WATER

(71) Applicants: Singapore University of Technology and Design, Singapore (SG); Massachusetts Institute of Technology, Cambridge, MA (US)

(72) Inventors: Hui Ying Yang, Singapore (SG); Rohit Karnik, Cambridge, MA (US)

(73) Assignees: Singapore University of Technology, Singapore (SG); Massachusetts Institute of Technology, Cambridge, MA (US)

( * ) Notice: Subject to any disclaimer, the term of this patent is extended or adjusted under 35 U.S.C. 154(b) by 234 days.

(21) Appl. No.: 14/401,799

(22) PCT Filed: May 20, 2013

(86) PCT No.: PCT/SG2013/000205
§ 371 (c)(1),
(2) Date: Nov. 17, 2014

(87) PCT Pub. No.: WO2013/172795
PCT Pub. Date: Nov. 21, 2013

(65) Prior Publication Data
US 2015/0122735 A1 May 7, 2015

Related U.S. Application Data

(60) Provisional application No. 61/648,870, filed on May 18, 2012.

(51) Int. Cl.
*B01D 71/12* (2006.01)
*C02F 1/44* (2006.01)
(Continued)

(52) U.S. Cl.
CPC ............. *B01D 71/12* (2013.01); *B01D 61/18* (2013.01); *B01D 69/02* (2013.01); *B01D 69/10* (2013.01);
(Continued)

(58) Field of Classification Search
None
See application file for complete search history.

(56) References Cited

U.S. PATENT DOCUMENTS 7,611,628 B1  11/2009  Hinds
2005/0263456 A1* 12/2005 Cooper ................. A61L 2/0082
                                                        210/660
(Continued)

FOREIGN PATENT DOCUMENTS

EP        2305368 A1    4/2011
WO    WO-2007001405 A2  1/2007
(Continued)

OTHER PUBLICATIONS

Dumee et al. "Enhanced Durability and Hydrophobicity of Carbon Nanotube Bucky Paper Membranes in Membrane Distillation" Journal of Membrane Science vol. 376, pp. 241-246. 2011.
(Continued)

*Primary Examiner* — Krishnan S Menon
(74) *Attorney, Agent, or Firm* — Cesari and McKenna, LLP

(57) ABSTRACT

The present invention relates to a material. In particular, it relates to a membrane for filtering water. More particularly, it relates to a membrane comprising carbon nanotubes and mixed cellulose ester porous membranes for water desalination and purification. Still more particular, the membrane comprising a fibrous substrate and carbon nanotubes formed on a fibrous substrate, wherein the surface of the carbon nanotubes is functionally modified. A microfluidic device (Continued)

comprising such a membrane and a method for filtering water are also disclosed.

12 Claims, 13 Drawing Sheets

(51) Int. Cl.
*B01D 61/18* (2006.01)
*B01D 69/14* (2006.01)
*B01D 71/02* (2006.01)
*B82Y 30/00* (2011.01)
*B01D 69/02* (2006.01)
*B01D 69/10* (2006.01)

(52) U.S. Cl.
CPC ......... *B01D 69/148* (2013.01); *B01D 71/021* (2013.01); *C02F 1/441* (2013.01); *B82Y 30/00* (2013.01)

(56) References Cited

U.S. PATENT DOCUMENTS

2008/0149561 A1\* 6/2008 Chu .................. A61L 15/425
210/500.38
2010/0025330 A1 2/2010 Ratto et al.
2010/0116751 A1 5/2010 Bajpai et al.
2011/0220574 A1\* 9/2011 Bakajin ................ B01D 53/228
210/650

FOREIGN PATENT DOCUMENTS

WO WO-2009035415 A1 3/2009
WO WO-2009148959 A2 12/2009

OTHER PUBLICATIONS

Xu et al. "Effects of Surface Modification of MWCNT on the Mechanical and Electrical Properties of Fluoro Elastomer/MWCNT Nanocomposites" Journal of Nanomaterials vol. 2012, pp. 1-9. 2012.

Han et al. "Uniform, Dense Arrays of Vertically Aligned, Large-Diameter Single-Walled Carbon Nanotubes" Journal of the American Chemical Society vol. 134, pp. 6018-6024. 2012.

\* cited by examiner

MEMBRANE FOR FILTRATING WATER

CROSS REFERENCE TO RELATED APPLICATIONS

This application is the National Stage of International Application No. PCT/SG2013/000205, filed on May 20, 2013, which claims the benefit of U.S. Provisional Application No. 61/648,870, filed on May 18, 2012. The contents of both applications are hereby incorporated by reference in their entirety.

FIELD OF THE INVENTION

The present invention relates to a material. In particular, it relates to a membrane for filtering water. More particularly, it relates to a membrane comprising carbon nanotubes and mixed cellulose ester porous membranes for water desalination and purification. A microfluidic device comprising such a membrane and a method for filtering water is also disclosed.

BACKGROUND OF THE INVENTION

Water treatment technologies including water desalination and purification are critical for addressing the issues of clean water shortage around the world[1,2]. Reverse osmosis (RO)[3,4] and thermal processes[5] are widely implemented in large-scale, industrialized desalination plants. However, large-scale plants consume a large amount of energy and involve high operating costs associated with infrastructure and skilled labor[6], making them difficult to be implemented in developing countries and resource-limited areas. Smaller point-of-use (POU) potable water purification devices[7-10], on the other hand, can avoid many of these obstacles and are increasingly recognized as one of the appropriate approaches to meet the needs of clean water and sanitation at the household and community levels.

POU water purification systems often comprise materials that adsorb contaminants, the most common being activated carbons obtained by a variety of methods[11]. However, while activated carbons can effectively remove organic contaminants and heavy metals, their capacity to adsorb salts is limited, and there are currently only few techniques that can efficiently desalinate water at a small scale[3]. Development of materials with high salt adsorption capacity will enable the realization of simple POU systems for direct desalination and purification of brackish water. Recently, carbon nanotubes (CNTs) have emerged as promising nanomaterials in water purification and desalination devices, mainly owing to three advantageous features[12-15]: (i) fast water flux enabled by the hydrophobic and frictionless graphitic walls; (ii) large surface area arising from the one-dimensional, high-aspect-ratio tubular structure; and (iii) ease of incorporating different functionalities on the graphitic walls of CNTs. It has been demonstrated both experimentally and theoretically that water permeability through CNT interiors could be at least three orders of magnitude higher than that predicted by the Hagen-Poiseuille law[12,13]. This high water flux could thereby significantly reduce the energy consumption in water treatments.

The most intriguing way of integrating CNTs into water purification and desalination devices is to use vertically aligned CNTs with functionalized open ends[16,17]. This aligned hollow structure allows pure water to pass through the inner core space of the nanotubes but reject salt ions and/or large-sized contaminants[18,19]. However, challenges with this approach include complex fabrication, scalability and clogging issues, as well as major difficulties in obtaining uniform CNTs with diameters smaller than the sizes of the solvated ions[20,21]. An alternative approach is to directly deposit CNTs onto a porous membrane and remove salt via capacitive electrostatic interactions[22-24]. Nevertheless, the salt rejection capability of CNTs in such configurations is poor for solutions with a high salt concentration due to the small Debye (electrostatic screening) length[25,26]. Other methods, such as surface functionalization with carboxylic and alkoxysilane-based chemical groups, were also reported to enhance water flux and desalination efficiency of such CNT-based membranes, e.g., as demonstrated in the case of membrane distillation[27].

Hence, there exist a need for an improved membrane for water desalination and purification.

SUMMARY OF THE INVENTION

In accordance with a first aspect of the invention, there is provided a membrane comprising a fibrous substrate and carbon nanotubes formed on a fibrous substrate, wherein the surface of the carbon nanotubes is functionally modified. Preferably, any polymer membrane suitable for water filtration may be used.

Preferably, the surface of the carbon nantotubes is plasma modified. More preferably, the plasma modification is ion beam plasma modification.

By "plasma", it is meant to include any partially ionized gas generated by applying an electrical field to a gas under at least partial vacuum.

Preferably, the fibrous substrate is a mixed cellulose ester porous membrane.

Preferably, the carbon nanotubes are ultralong carbon nanotubes.

Preferably, the carbon nanotubes are multi-walled carbon nanotubes.

Preferably, the carbon nanotubes are vertically aligned.

Preferably, the height of the carbon nanotubes are between 100 to 200 µm.

Preferably, the diameter of the carbon nanotubes are between 10 to 20 nm.

Preferably, the carbon nanotubes have a wall number of between 5 to 10.

Preferably, the density of the carbon nanotubes on the fibrous substrate is 0.8 g/cm$^3$.

Preferably, the porosity of the membrane is 60%.

In accordance with a second aspect of the invention, there is provided a microfluidic device comprising a membrane according to the first aspect of the invention.

In accordance with a third aspect of the invention, there is provided a water filtration method, comprising passing water through the membrane according to the first aspect of the invention.

Preferably, the filtration method comprises a reverse osmosis desalination method, a nanofiltration method or an ultrafiltration method.

In the present invention, advantageously, we demonstrate that plasma treatment of carbon nanotubes can result in ultrahigh capacity to adsorb salt. We construct an adsorptive membrane by depositing a thin layer of ultralong carbon nanotubes (UCNTs) onto a mixed cellulose ester (MCE) porous support. We show that by subsequently modifying the UCNTs with plasma, the membranes can effectively remove salt, organics, and nanoparticles simultaneously from aqueous solutions. As salt is adsorbed rather than rejected, the required operation pressure is significantly less than that required for RO. The ultrahigh adsorption capacity is attributed to the plasma-mediated conversion of the outer layers of the UCNTs to anamorphous network. This invention presents a new approach to realize carbon-based materials with ultrahigh specific adsorption capacity for salts.

DETAILED DESCRIPTION OF THE PREFERRED EMBODIMENTS

In order that the present invention may be fully understood and readily put into practical effect, there shall now be described by way of non-limitative examples only preferred embodiments of the present invention, the description being with reference to the accompanying illustrative figures.

Methods & Materials

1. Synthesis of Ultralong Carbon Nanotubes

Figure 1:
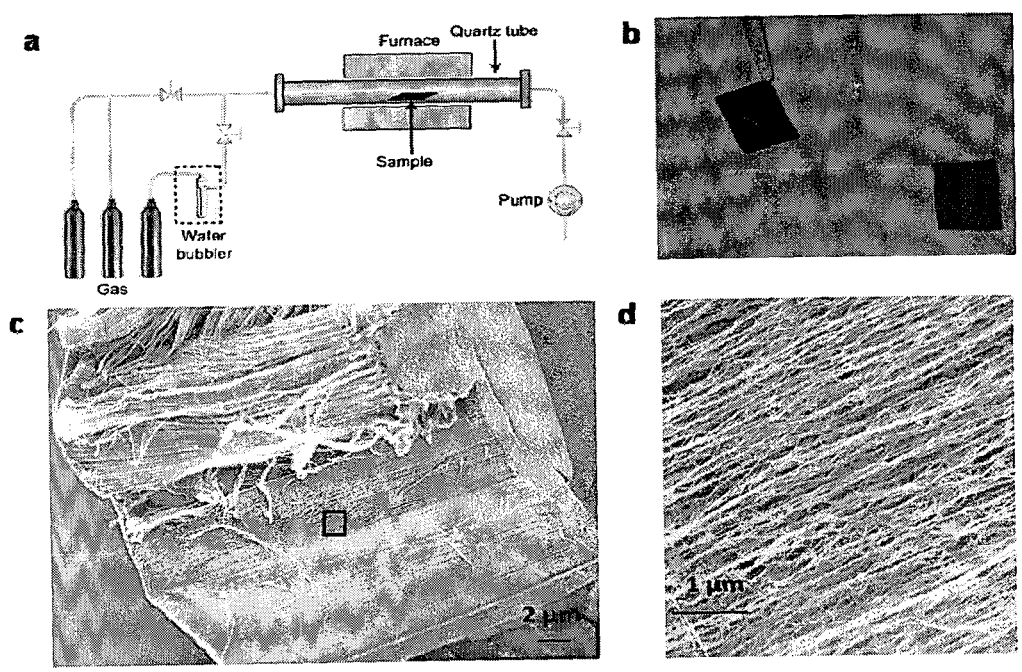
FIG. 1 illustrates the growth of the vertical aligned UCNT arrays according to an embodiment of the invention. a. The schematic diagram of the water-assisted CVD system for growing UCNTs. b. Photo of the as-grown samples removed from the silicon substrate. c. SEM image shows the aligned, high density UCNT arrays. d. High-resolution SEM image as squared in c.

Vertically-aligned, ultralong carbon nanotubes (UCNTs) were synthesized by water-assisted chemical vapour deposition process as reported previously[26,27]. Briefly, a 0.5 nm thick Fe catalyst film was deposited on n-type Si substrate coated with $Al_2O_3$ and $SiO_2$ interlayers with a thickness of 10 and 100 nm respectively. The catalyst was then loaded into a 2" quartz tube of a thermal furnace (MTI; OTF-1200×). The catalyst was then annealed to 750° C. under an $Ar/H_2$ (900/600 sccm) mixture at the atmospheric pressure. The growth of CNTs was started by introducing $C_2H_4$ at a flow rate of 600 sccm and a trace amount of water. After typically 10 min, the growth was terminated and the furnace was cooled down to room temperature. UCNTs with an average of 5-10 walls and a height of 100-200 µm were obtained (See FIG. 1). A photo of the dense black color CNT arrays removed from the growth substrate is shown in FIG. 1b. SEM images of the aligned, high density UCNT arrays are also shown in FIG. 1c and d.

2. Fabrication and Modification of UCNT-Based Membranes

To fabricate the membranes, the vertically aligned UCNTs were removed from the silicon substrate and dispersed in 1 wt % sodium dodecyl sulphate (SDS) solution. The same procedures were applied to fabricate UCNT- and short MWCNT-based membranes (the short MWCNTs were purchased from PlasmaChem GmbH). The solution was sonicated for 30 min using a tip-sonicator (Sonics VCX1F30) to yield a stable and uniformly dispersed UCNT ink. The UCNT ink was then deposited onto the commercially-available mixed cellulose ester (MCE) porous membranes (Millipore GSWP04700) by vacuum filtration[30].

Vacuum filtration technique (FIG. 2a) was then used to fabricate the membranes by adding 40 ml of UCNT solution (or 10 ml of the MWCNT solution as the concentration was higher) to the 47 mm MCE membrane (FIG. 2b and c), with carefully avoiding any bubbles. It should be noted that the porous size of the membranes is large (>100 nm) so that it will not affect the filtration process. The as-prepared membrane was then dried and cut into 1×1 $cm^2$ size for water desalination and purification. It is possible to scale up if the UCNTs-MCE composites are connected in a matrix format so that the surface area can be increased to a larger value. As control sample, the pure MCE membrane was also integrated into the micro-channel devices. No desalination function was observed, as shown by the invariant conductivity curves (FIG. 2d).

The residual surfactant in the UCNT-MCE membrane was removed by filtering with copious tap water. After drying completely in a vacuum oven, the UCNT-MCE membrane was weighed by a balance (sensitivity ~0.01 mg; Mettier H20T) and the density of CNTs on the membrane was estimated (~8 µg/$cm^2$; equivalent to a volume density of 0.8 g/$cm^3$). The porosity was therefore ~60% by assuming that the density of bulk CNTs is 1.4 g/$cm^3$. Further microscopic images indicated that the homogeneous CNT film conformed well to the MCE membrane with a thickness of ~0.5 µm (See FIG. 8).

Figure 3:
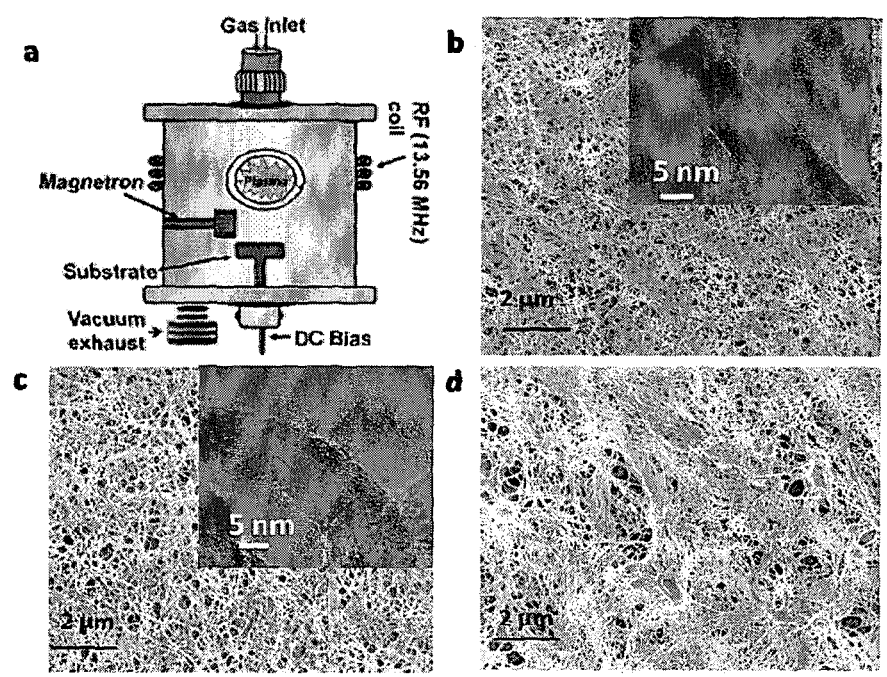
FIG. 3 illustrates the surface modification of the UCNTs according to an embodiment of the invention. a. The schematic diagram of the ICP plasma source treatment chamber. b-d are the SEM images of the UCNT-MCE membrane: b. pristine, c. 10 min plasma modified, and d. 2 hour $HNO_3$ acid modified membranes. Insets in b and c show the corresponding TEM images.

Both acid- and plasma-modification were conducted to functionalize the UCNT-based membranes. For acid modification, the membranes were immersed into 5N $HNO_3$, refluxed for 2 h, and then washed with de-ionised water. For plasma modification, the membranes were placed in a plasma chamber with a "remote" inductively-coupled plasma (ICP) configuration (See FIG. 3). The distance between the plasma source and the membranes was about 40 cm. The plasma was generated by a radio-frequency (RF) power operated at frequency of 13.56 MHz and power of 600 W, with 40 sccm Ar gas at a pressure of 2 Pa. The distance between the center of the plasma and the UCNT-MCE membranes was ~40 cm. The modification time lasted for 5 and 10 min respectively. FIGS. 3b and c show the SEM images of the pristine and 10 min plasma modified UCNT-MCE membranes respectively. It is noted that there is no broken of UCNTs except the surface roughness has been changed. For acid modification, the membranes were immersed in 5N $HNO_3$, refluxed for 2 h, and then washed with de-ionised water. SEM image of the acid modified membrane is showed in FIG. 3d.

Figure 4:
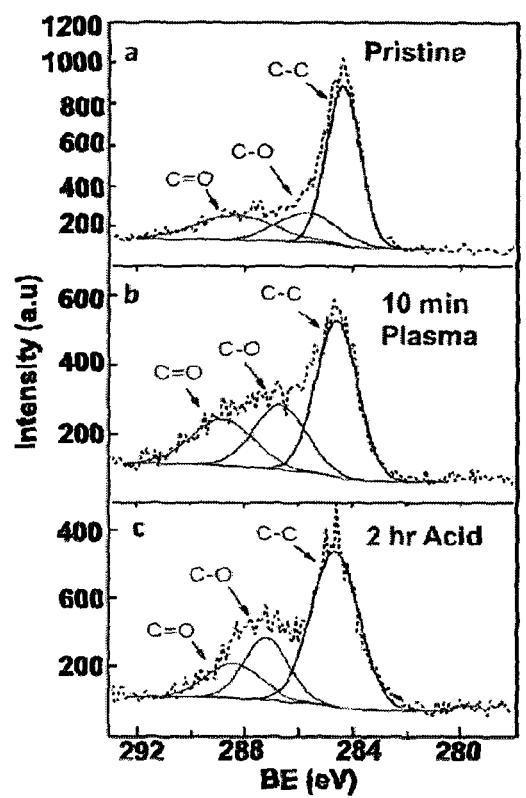
FIG. 4 shows XPS spectra of C 1 s peaks: a. pristine, b, 10 min plasma modified, and c, acid modified UCNT-MCE membranes. Three peaks corresponding to the C—C, C—O and C═O bonds can be resolved in all spectra. However, the intensities of the C—O and C═O peaks are relative higher in the plasma modified sample.

XPS analyses indicated that oxygen-containing functional groups (such as C=O and C—O bonds) were introduced onto the graphitic walls of UCNTs after both plasma and acid modifications. However, the portion of these functional groups were more prominent on plasma modified samples (FIG. 4).

Table 1 below shows all the samples used in the present invention.

TABLE 1

| UCNTs | (i) Pristine UCNT-MCE | (ii) HNO3 treatment 2 hrs | (iii) Plasma treatment 5 min | (iv) Plasma treatment 10 min |
|---|---|---|---|---|
| Short MWCNTs | (v) Pristine MWCNT-MCE | (vi) Plasma treatment 10 min | | |

We compared the performance of UCNT-based with the short MWCNT-based membranes in the present experiments (Table 1). According to the manufacturer's specifications, these MWCNTs have a length of 1-10 µm diameter of 5-20 nm, and a wall number of 3-15. After fabricating the MWCNT-MCE membranes, the same plasma modification procedure was implemented. We found that, contrary to the UCNTs, the Raman and XPS spectra indicated that plasma modification induced less effect on these MWCNTs (FIGS.

6 and 7). This is probably due to that the MWCNTs already had a high portion of amorphous carbon and defective graphitic structure at their pristine state. While plasma can functionalize the graphitic walls, it can also etch away these amorphous structures and result in a cleaner surface.

Figure 8:
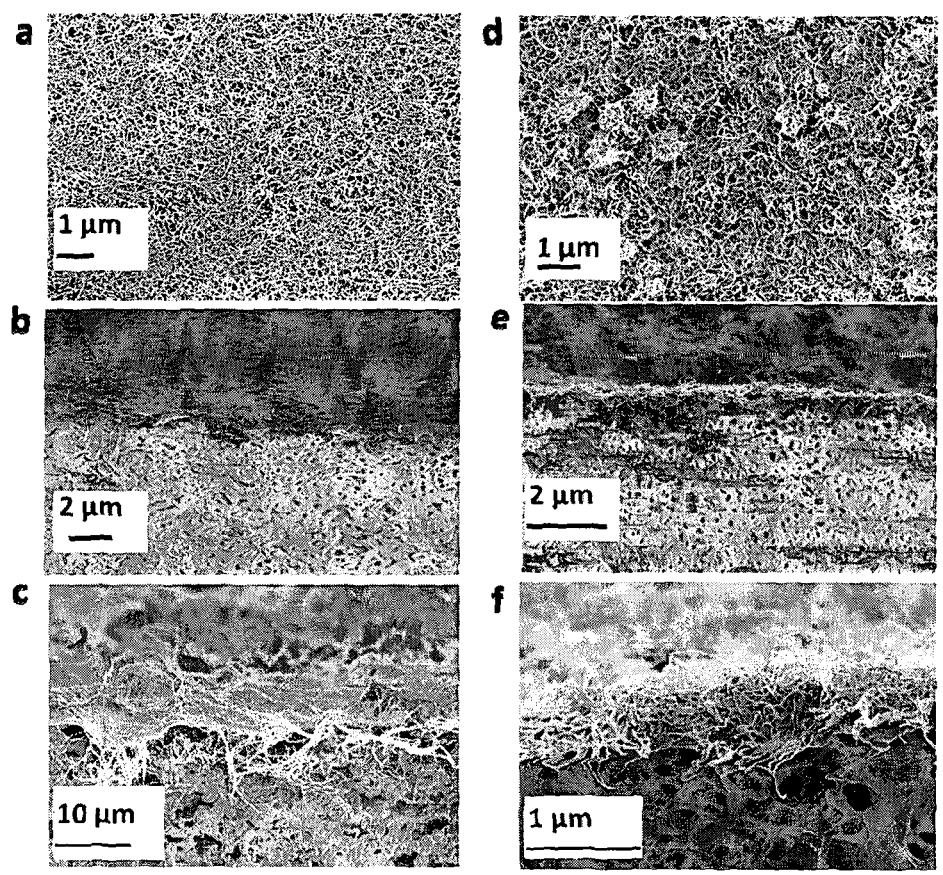
FIG. 8 shows cross-sectional SEM images of both UCNT-MCE and MWCNT-MCE membranes. a and b are the top-view and cross-sectional SEM images of pristine UCNT-MCE membranes. c, cross-sectional SEM image of 10 min plasma modified UCNT-MCE membrane. d and e are the top-view and cross-sectional SEM images of pristine MWCNT-MCE membranes. f, cross-sectional SEM image of 10 min plasma modified MWCNT-MCE membrane.

We also examined the cross-sectional SEM images of both UCNT-MCE and MWCNT-MCE membranes (FIG. 8). It was found that densely-packed, uniform structures were formed on the UCNT layer, while relatively sparse and loose structures were formed on the short MWCNT layer. The degree of van der Waal's interactions may cause such morphological difference in long UCNTs and short MWCNTs. It was noted that plasma treatment did not damage both UCNT- and NWCNT-based membrane structures.

3. Micro-Channel and Static Water Tests

Figure 5:
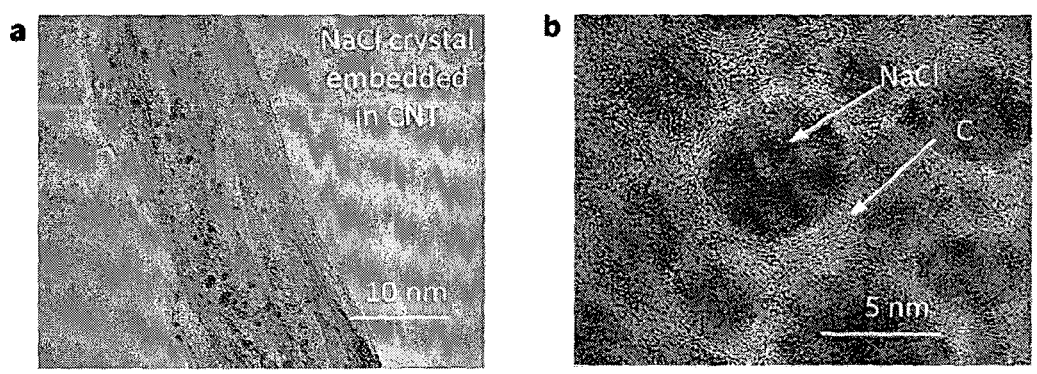
FIG. 5 shows electron microscope images of the UCNT. a, TEM and b, HRTEM images of the 10 min plasma-modified UCNT after the desalination experiment. NaCl nanocrystals embedded in the UCNT networks can be clearly identified.

The polydimethylsiloxane (PDMS) was used to fabricate the microfluidic channel devices. The external flow rate was generated with a syringe pump (Harvard Apparatus, PHD 2200). All flow patterns and particle motions were imaged with an inverted fluorescence microscope (Olympus, IX-51). An ac power supply was used to apply an electric potential to the stream of the outlet of the device and the current-voltage (I-V) characteristics were measured using Keithley 2400 electrometer with two Ag/AgCl microelectrodes. FIG. 5 shows the TEM images of 10 min plasma modified samples after the desalination experiment, where NaCl nanocrystals embedded in the UCNT networks can be clearly identified. Furthermore, Na ion has the smallest dimension (from the periodic table) when compared to Mg, Ca, Pb etc. It is therefore reasonable to believe that the proposed UCNTs devices are capable to remove these metal ions. The removing of other ions are under study.

Figure 9:
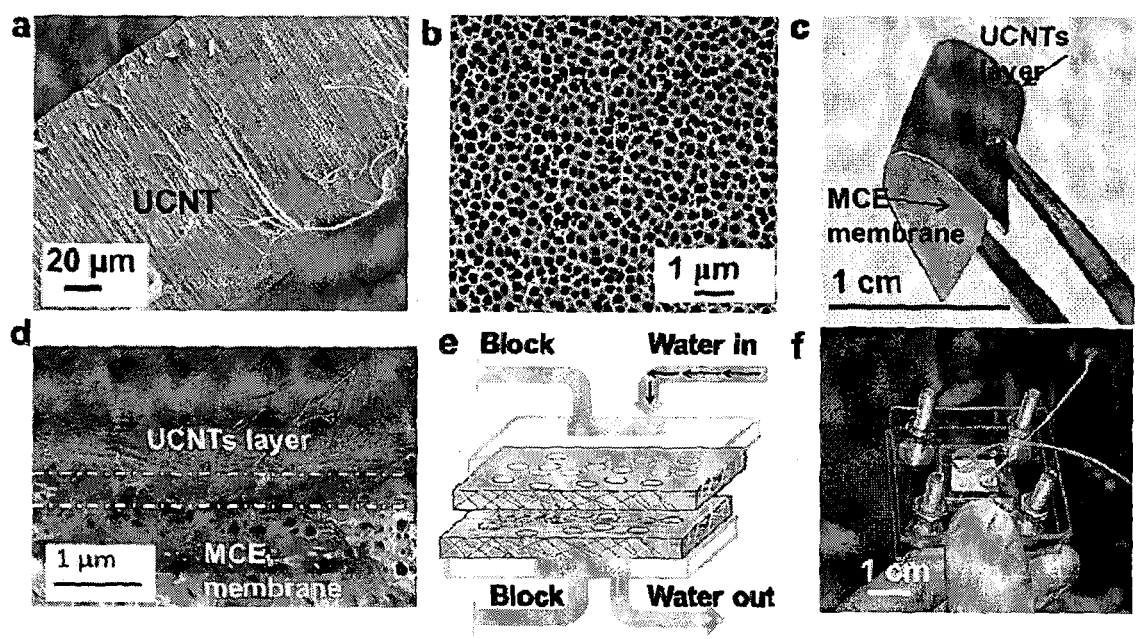
FIG. 9 shows the ultralong carbon nanotube-based membranes in a micro-channel device according to an embodiment of the invention. a, Cross-sectional SEM image of the pristine UCNTs. b, Top-view SEM image of the porous mixed cellulose ester (MCE) support with an average pore size of 220 nm. c, Photo of a UCNT-MCE membrane fabricated by vacuum filtration. Excellent flexibility of the membrane is demonstrated by the large-angle bending with no surface damage or structural degradation. d, Cross-sectional SEM image of the pristine UCNT-MCE membrane. The thickness of the UCNT layer is ~0.5 μm. e, Schematic diagram of the UCNT-MCE membrane integrated into a micro-cross channel device. Salt water flows through the channel with two identical membranes pressed face-to-face. f, Photo of the actual micro-channel device.

To test the desalination performance of membranes, the micro-channel device as shown in FIG. 9f was used. First, the UCNT-MCE membranes were cut into small pieces with an area of 1×1 cm$^2$. Two identical pieces were then pressed face-to-face in the micro-channel device. The entire micro-channel device, connecting tubing, and a pre-calibrated microfluidic conductivity measurement device comprising the fixed channel geometry (volume ~100 μL) and the embedded Ag/AgCl electrodes were first filled with the NaCl solution. The microfluidic device was then opened and the UCNT membrane was loaded into the device. The NaCl solution was then pumped through the device by a syringe pump (Harvard Apparatus, PHD 2200) at a flow rate of 10 μL/min. After allowing for 140 μL of the volume to flow (corresponding to the dead volume in the system), the conductivity of the outlet was monitored by measuring the conductance of the microfluidic device. No membrane clogging was found throughout the desalination operations.

For the purification of rhodamine-dextran(RD) molecules, 2.5 mg/mL solution was prepared in deionized water and the pH of the solution was adjusted to 7 (neutral) or 4 (anionic) respectively. The entire system was first filled with the RD solution, and a fresh UCNT membrane was loaded into the device. The RD solution was then flowed through the membrane at a flow rate of 10 μL/min. Every 10 min, 100-μL aliquots were collected in a vial and were analyzed by a UV-Vis spectrophotometer. For the filtration of gold nanoparticles, solutions of gold nanoparticles with a diameter of 5 nm (5.47×10$^{13}$ nanoparticles/mL) and a diameter of 10 nm (5.98×10$^{12}$ nanoparticles/mL) were used in the micro-channel device, and the same procedure as that for RD was followed.

Figure 13:
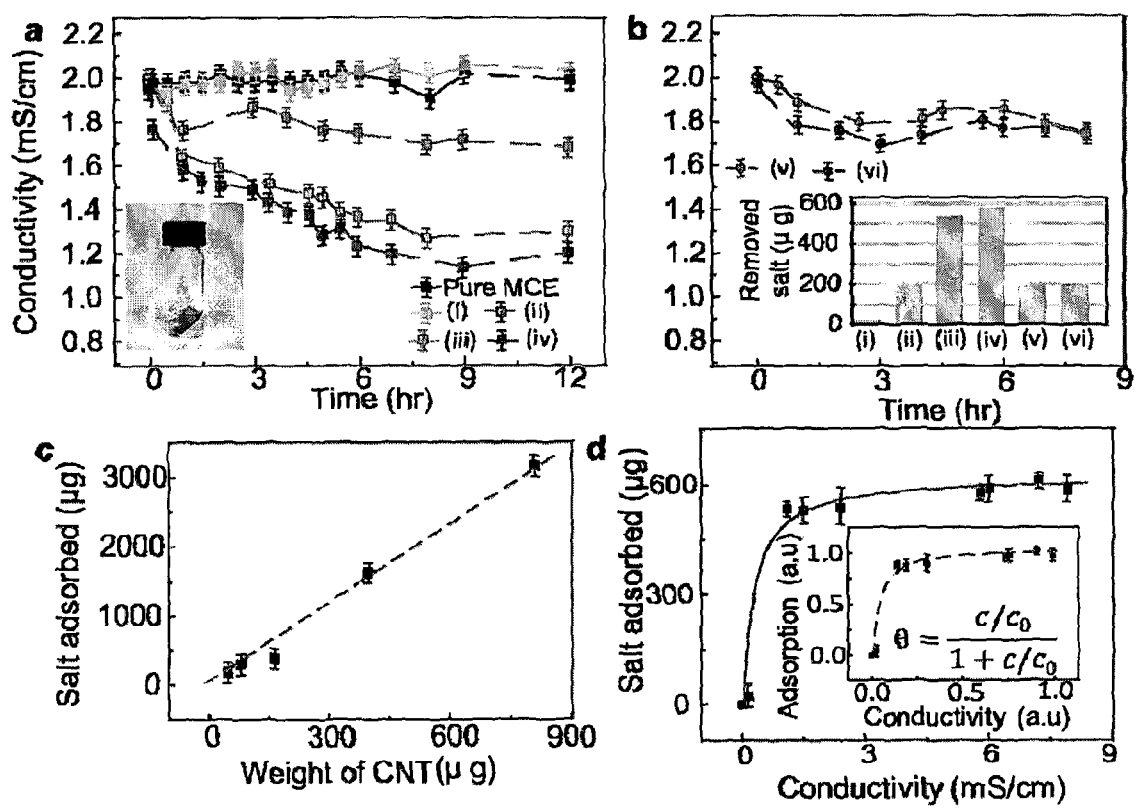
FIG. 13 shows the adsorption tests in static salt water using the membrane to filter the water according to an embodiment of the present invention. a, The plots of conductivity changes in static salt water when membranes are immersed in 1 mL of 0.02 M salt water. Membranes include: pure MCE, (i) pristine UCNT-MCE, (ii) acid modified UCNT-MCE, (iii) 5 min plasma modified, and (iv) 10 min plasma modified UCNT-MCE. Inset in a shows a photo of the membrane immersed in the salt solution. b, Conductivity changes in static salt water using short MWCNT-based membranes: (v) pristine MWCNT-MCE and (vi) 10 min plasma modified MWCNT-MCE. Inset in b plots the amount of salt removal of all membranes in a and b. c, Salt removal for 10 min by plasma modified UCNT-MCE with different UCNT mass in 0.02 M salt water. d, 160 µg of UCNT-MCE in salt water with different conductivity. Inset in d shows the Langmuir isotherm equation fitting plot of the experiment results, where the θ is the mass of salt adsorbed normalized by the total salt adsorption capacity, cis the normalized conductivity of the salt water and $c_0$ is the Langmuir adsorption constant.

Finally, to measure the adsorption capacity of the membranes in static salt water, two identical samples of each membrane (1×1 cm$^2$) were immersed into 1 mL of salt water at a concentration of 0.02 M (inset of FIG. 13a). The corresponding conductivities were then monitored every 30 min by an electrometer.

Results and Discussion

1. Fabrication and Modification of UCNT Membranes

Figure 2:
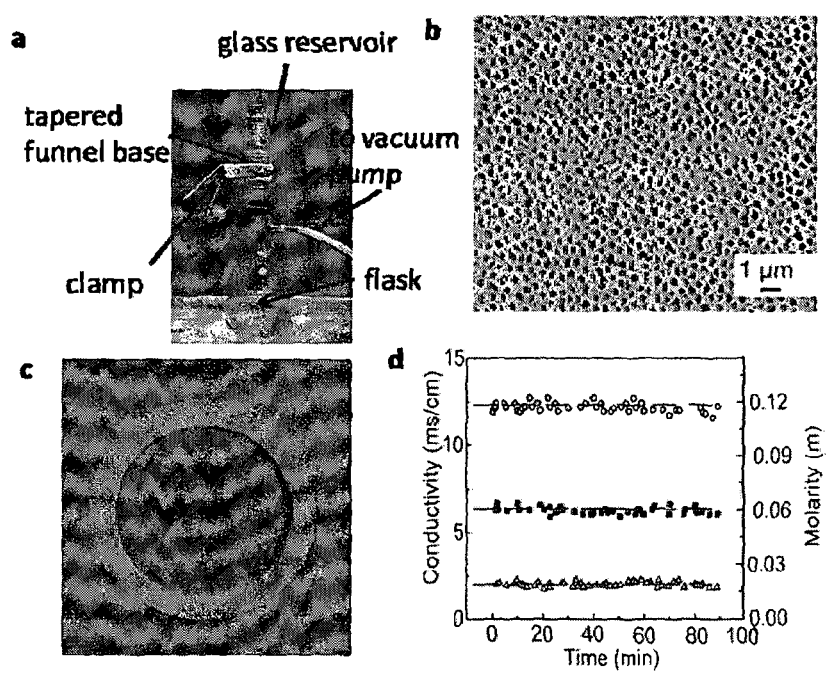
FIG. 2 illustrates the preparation of the CNT-based membranes according to an embodiment of the invention. a. Photo of the vacuum filtration system for membrane fabrication. b. SEM image of the pure MCE membrane showing the porous structure. c. Photo of the as-fabricated UCNT-based membrane. d. Conductivity measurements of the pure MCE membrane tested at three different concentrations of salt water. No desalination property was observed.

UCNTs were synthesized by a water-assisted chemical vapor deposition (WA-CVD) process[28,29]. Scanning electron microscopy (SEM) and transmission electron microscopy (TEM) images indicated that these UCNTs had a vertically-aligned, closely packed structure with a height of 100-200 μm, a diameter of 5-20 nm, and a typical wall number of 5-10 (FIG. 9a and FIG. 1). The UCNTs were then removed from the growth substrate and sonicated in an aqueous solution with a surfactant (sodium dodecyl sulfate, SDS) to form the CNT ink. Membranes based on these UCNTs were fabricated by vacuum filtration technique[30], where a conformal thin layer of UCNTs was deposited on the porous MCE support (pore size of ~220 nm; FIG. 9b). The resultant UCNT-based membranes were mechanically robust and could be bent at an angle of 90° or more than 20 times without damage or loss of structural integrity (FIG. 9c). FIG. 9d shows the cross-sectional images of the membrane, where a ~0.5 μm thick UCNT layer wrapping around the pores of the MCE support is clearly observed. The UCNT layer features a highly-porous structure (~60% porosity; FIGS. 2 and 3), which is desirable for effective water flow.

The membrane was then incorporated into a micro-channel device consisting of two identical membranes pressed together face-to-face to form the filtration section (FIG. 9e). A photo of the integrated micro-channel device is also shown in FIG. 9f. Prior to the device integration, we modified the UCNTs via acid or plasma to investigate the correlation between the surface functionalities and the desalination efficiency (see Methods). Figure boa shows the resonant micro-Raman spectra of all the UCNT-MCE membranes used in the experiments. In these spectra, the G peak at 1584 cm$^{-1}$ can be assigned to the phonon mode $E_{2g}$ in CNTs, which involves the out-of-phase intra-layer displacements; while the D (at 1350 cm$^{-1}$) and D' (at 1622 cm$^{-1}$) peaks correspond to the disorder-induced phonon modes arising from the finite size of the crystals and defects, respectively[31]. The positions of these peaks remained essentially unchanged for pristine and acid/plasma-modified UCNT-MCE membranes. However, the relative intensities of the D and G peaks (i.e., $I_D/I_G$ ratio), which is generally used to determine the impurity and structural quality of CNTs[32], increased from 0.8 for the pristine membrane to 1.26 for the plasma-modified one (inset of FIG. 10a). This indicated that more defective structures were induced on the UCNTs by the plasma modification[33].

Figure 10:
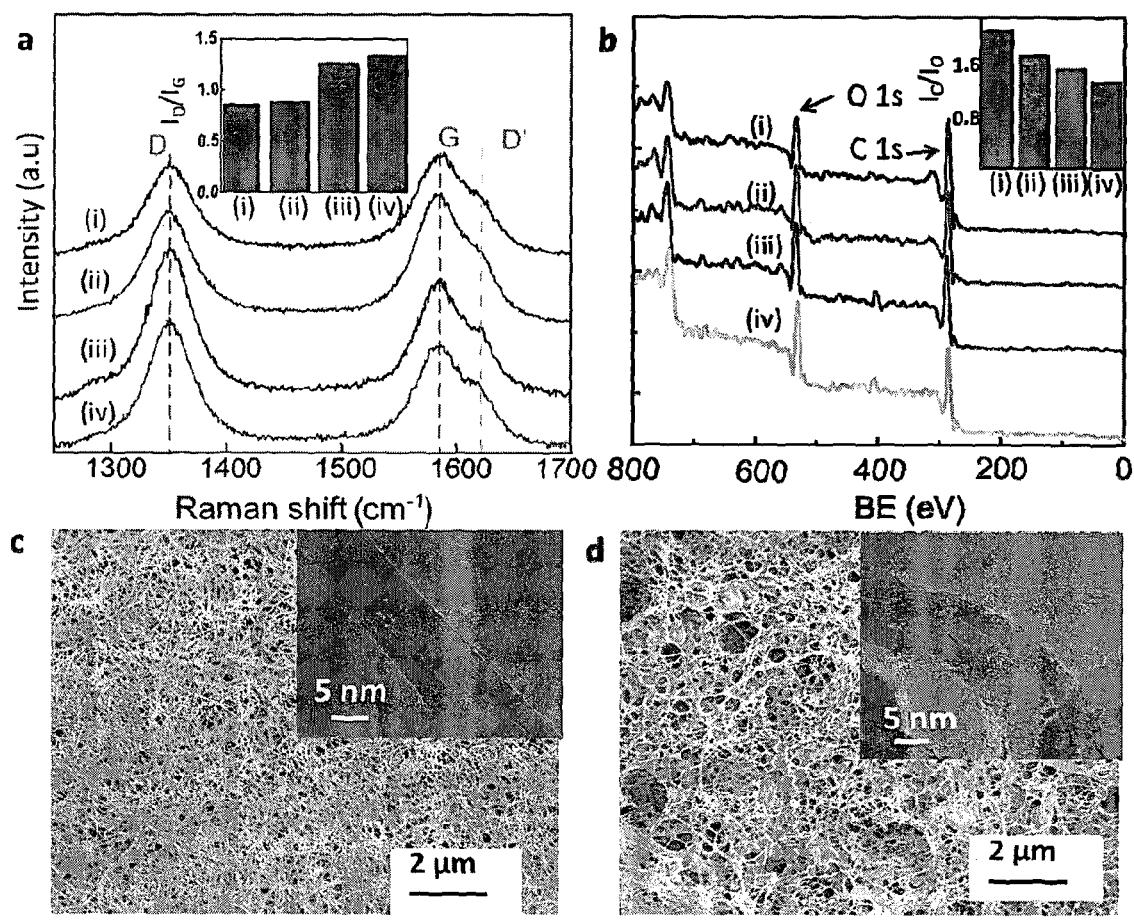
FIG. 10 shows the surface properties of UCNT-MCE membranes according to an embodiment of the present invention. a, Raman and b, XPS spectra of four different UCNT membranes used in the experiments: (i) pristine, (ii) acid modified, (iii) 5 min plasma modified, and (iv) 10 min plasma modified membranes. Raman D, G, and D' peaks are labeled in a and XPS C 1 s and O 1 s peaks are labeled in b. Inset of a plots the D/G peak intensity ratio ($I_D/I_G$) of the four samples and inset of b plots the C/O peak intensity ratio ($I_C/I_O$). Top-view SEM image of (c) pristine and (d) plasma modified (with 10 min plasma treatment) UCNT membranes. The insets of (c) and (d) are high-resolution TEM images of a typical single UCNT before and after plasma (10 min treatment), respectively. The lattice spacing between the two atomic layers is measured to be 0.34 nm. The typical wall numbers of the UCNT is about 10 to 12.

The above Raman analysis was further verified by X-ray photoelectron spectroscopy (XPS). As shown in FIG. 10b, the intensity ratio between C 1 s and O 1 s peaks of the pristine UCNT-MCE membrane (i.e., $I_C/I_O$ ratio) decreased after the plasma modification. The corresponding C is narrow scans revealed that more oxygen-containing bonds, such as the hydroxylic (—OH) and carboxylic (—COOH) surface groups, were formed in the plasma-modified samples (FIG. 4). These results unambiguously indicated that the plasma had introduced surface functional groups and altered the UCNT structure, which in turn played an important role in the adsorption-based water desalination and filtration. In addition, the morphology and structure of the UCNT layers before and after plasma modification were studied by SEM and TEM. FIGS. 10c and 10d illustrate the SEM images of the pristine and plasma-modified UCNT-MCE membranes respectively. It was observed that the pristine UCNTs were synthesized with a high quality. Few amorphous carbon structures were detected and highly ordered graphitic structures were found in the corresponding TEM images (inset of FIG. 10c). On the other hand, the UCNT-MCE membranes after 5 or 10 min plasma treatment exhibited severe structural damage on the outer layers where the graphitic walls were no longer evident (inset of FIG. 10d), which is consistent with the above Raman and XPS results. It should be noted that the structure of UCNTs was not completely destroyed in the plasma surface modification process; instead, the outer layers of UCNTs were functionalized (FIG. 3).

2. Desalination Using UCNT Membranes

The desalination performance of the pressure-driven micro-channel device was evaluated by measuring the conductivity change of salt water after flowing through the device with a single inlet and outlet (FIG. 9e). The entire system including the upstream and downstream volumes was initially filled with NaCl solution (3500 ppm or 0.06 M). Pre-filling with the saline solution was employed to avoid bubble entrapment and to exclude any fresh water from the system, so that any change in conductivity, could be directly related to the removal of salt by the UCNTs. The solution was then pumped through the device and the real-time salt concentration of the output stream was monitored.

Figure 11:
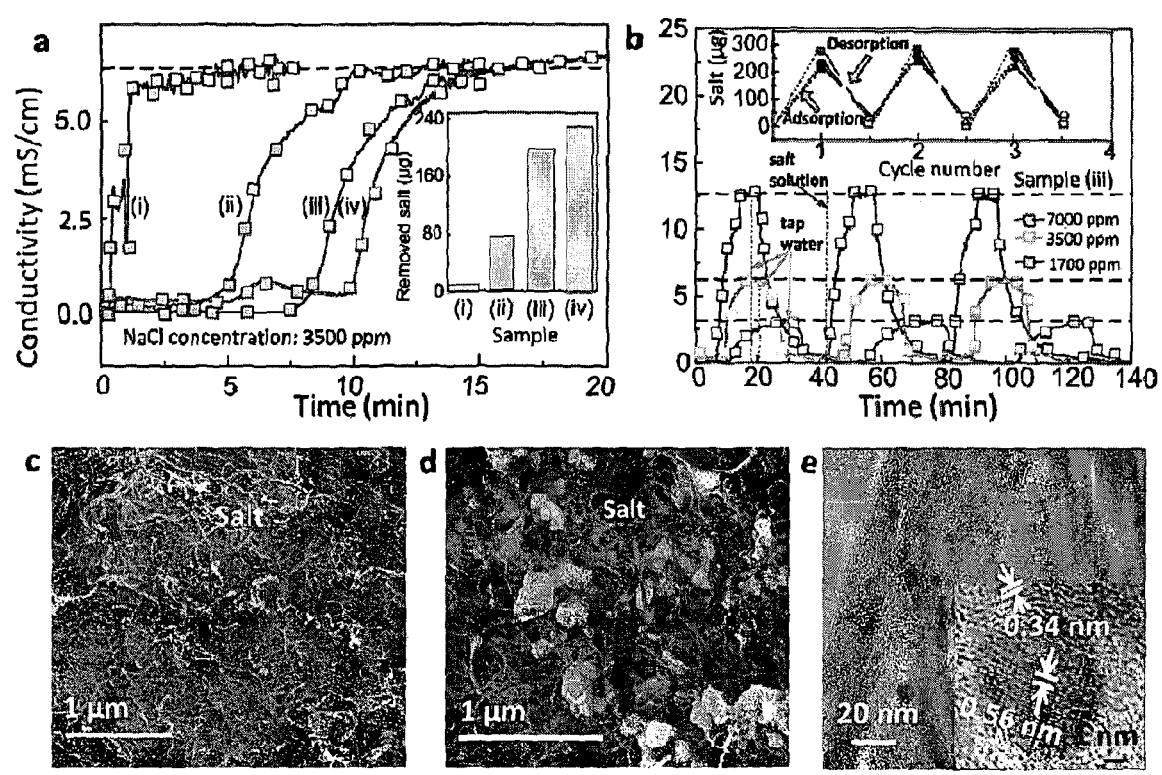
FIG. 11 shows the salt removal by UCNT-MCE membranes according to an embodiment of the present invention. a, Conductivity curves for the passages of 3,500 ppm NaCl solution through the micro-channel device using four membranes: (i) pristine, (ii) acid modified, (iii) 5 min plasma modified, and (iv) 10 min plasma modified membranes. Inset in a shows the mass of salt removed by each membrane. b, Plot of the conductivity of three adsorption-desorption cycles using sample iv at NaCl concentrations of 7,000, 3,500, and 1,700 ppm. Inset in b shows the mass of salt removed in each cycle. c, SEM image of sample i after the adsorption reaches saturation. d, SEM image of sample iv after the adsorption reaches saturation. More NaCl nanocrystals are observed on sample iv. e, TEM image of scattered NaCl nanocrystals in sample iv. Inset in e shows the crystal lattice of NaCl nanoparticles embedded in the UCNT networks.

FIG. 11a plots the conductivity curves of salt water after passing through the four different membranes (Table 1). The conductivity of salt water flowing through the pristine UCNT-MCE membrane (i.e., sample i) firstly decreased and then rapidly increased to reach a stabilized value of the initial NaCl solution within a short period of time (<1 min). In contrast, the conductivity remained at a significantly low level for the acid modified UCNT-MCE membrane (i.e., sample ii). Only after 5 min, the conductivity started to increase and finally reached the feed concentration value. For the plasma modified membranes (i.e., samples iii and iv), the conductivity did not start to rise until 7.5-10 min; and the stabilized value was reached only after 13-15 min.

The mass m of salt removed by each membrane can be calculated based on the conductivity curves and the flow rate[34]

$$m = \int_0^V (C_0 - C_t) \times dV \quad (1)$$

where $C_0$ is the initial salt concentration, $C_t$ is the real-time salt concentration determined from the electrical measurement, and V is the volume of the solution flowed. We found that approximately 8 μg (~18% w/w) of salt was removed by the pristine UCNT-MCE membrane (sample i; inset of FIG. 11a). This amount of salt removal significantly increased to ~60 μg for the acid-modified membrane (sample ii; inset of FIG. 11a). The maximum salt removal was observed on the two plasma-modified samples iii and iv (inset of FIG. 11a) with ~180 and ~225 μg of salt removal respectively. Considering that the total mass of UCNTs that contributed to the water desalination process was only about 45 μg, the adsorption capacity of the plasma-modified UCNTs (defined as the total removed salt divided by the total weight of UCNTs) is found to be 400% w/w (i.e., 4 g/g or 4000 mg/g). The amount of salt that can be removed by the activated carbons reported in the literature is around 2-20 mg/g (or 0.2-2% w/w)[11]. Therefore, the adsorption capacity of plasma-modified UCNTs is about two orders of magnitude higher than that of activated carbons. The amount of salt removal is also notably higher than the adsorption capacity of the state-of-the-art porous carbon materials (~15 mg/g or 1.5% w/w) used in the capacitive deionization[35].

3. Validation of Ultrahigh Adsorption Capacity

To further elucidate the ultrahigh specific adsorption capability of sample iv, the above experiment was repeated with the NaCl solution at varied concentrations of 7000, 3500 and 1700 ppm. FIG. 11b shows the adsorption-desorption cycles for sample iv, where the desorption process was carried out by flowing tap water (obtained from Cambridge Water Department, MA) following a maximum adsorption, i.e., a stabilized conductivity in the curves. One can see that at a higher NaCl concentration, the adsorption reached its maximum value faster than that at a lower concentration. The total amount of salt removed, however, was relatively constant regardless of the salt concentration (inset of FIG. 11b). This independence between the salt removal and the concentration (i.e., ionic strength) of the salt solution further confirmed the proposed adsorptive mechanism: If the salt removal was dominated by electrostatic repulsion or electrokinetic effects, the desalination capacity would be sensitive to the ionic strength and the Debye screening length's, but a constant amount of salt would be removed if the UCNTs had a high affinity for salt adsorption. Additionally, the plasma modified membrane could achieve a 100% recovery of its salt-removal capability simply by rinsing with tap water (FIG. 11b).

The adsorbed salt on the surface of different UCNT membranes was further visualized by SEM. As shown in FIGS. 11c and 11d, only a few NaCl nanocrystals were observed on the surface of the pristine sample i, whereas a significantly higher density of NaCl nanocrystals was found on the plasma modified sample iv. Small-sized NaCl crystals on the UCNTs, presumably on the defective sites and possibly penetrating within the UCNT, were also observed in the high-resolution TEM image (FIG. 11e and FIG. 5); and their crystal lattice could be clearly identified (inset of FIG. 11e). These observations further suggest that the UCNT-based membranes did not operate as a semipermeable medium to filter the salt (i.e., the mechanism of RO membranes); instead, they utilized the ultrahigh adsorption capacity to remove salt from the solution. It should be noted that in contrast to the absorption mechanism where molecules intercalate into the crystal structures of materials, the adsorption mechanism (surface effect) results in the nucleation of salt crystals on the surface and/or filling of the pores inside the membranes[36]. Given the different densities of UCNTs and NaCl crystals, the surface coverage and volume occupation of salt adsorbed is estimated to be 35-70% of the membrane, which agreed well with the microscopic observations.

We attribute this high adsorption capability of samples iii and iv to the numerous defective sites created by plasma treatment. The high-resolution TEM images suggest that the plasma treatment significantly damaged the UCNTs, making the outer layers amorphous and possibly porous (FIG. 10d and FIG. 5). Strong acid or plasma is known to partially damage the graphitic structure of CNTs and create dangling bonds, which then react with the ambient gases to form various functional/charged groups, particularly the oxygen-containing groups such as —COOH and —OH[18]. The above Raman and XPS analyses confirmed the presence of these functional groups on the acid/plasma modified UCNTs (FIG. 102). In combination with a high surface area, these functional groups could greatly enhance surface hydrophilicity and ion binding properties of the modified UCNTs[18]. In addition, with a small (~10 nm) UCNT diameter, their modified outer layers are easily accessible to the solution.

Consequently, a high salt adsorption capability was achieved with the modified UCNTs when salt water flowed through the porous structure[37,38].

It is worth mentioning that samples ii-iv could completely remove salt below the detection threshold of $10^{-7}$ M from the solution in the first round of the filtration process (shown in FIG. 11*a* in the first 5 min), whereas little salt was removed for the pristine UCNT-MCE membranes. The nearly complete removal of salt implied an excellent mass transfer from the solution to the UCNTs. Assuming a pore size of 200 nm, a UCNT layer thickness of 500 nm, and a flow velocity of $5\times10^{-5}$ m/s, the Péclet number ($P_e=\Box L/D$, where $\Box$ is the flow velocity, L is the characteristic length and D is the diffusion coefficient of sodium ions), which defines the ratio of convective to diffusive mass transfer, is estimated to be $2.5\times10^{-4}$. Since $P_e \ll 1$, it is expected that diffusion will be sufficient to ensure salt adsorption as the solution flows through the UCNT layer.

4. Removal of Organics and Metal Nanoparticles

An efficient water membrane should also be capable to effectively remove organic or inorganic contaminants linking to waterborne diseases, including biomolecules, microorganisms, and heavy metals. To verify such capability of the current UCNT-MCE membranes, we used sample iv as an example to filter dextran molecules ($M_w$=70,000) labeled with rhodamine. The aqueous solution of these fluorescent rhodamin-dextran (RD) conjugates was filtered through the same micro-channel device and the concentration of RD in the filtered water was determined by UV-Vis spectrophotometry. To examine the effect of charges on RD molecules ($pK_a$~6.4)[19], the solution's pH value was also adjusted to 4 or 7. 100-μL aliquots were collected during the filtration process.

Figure 12:
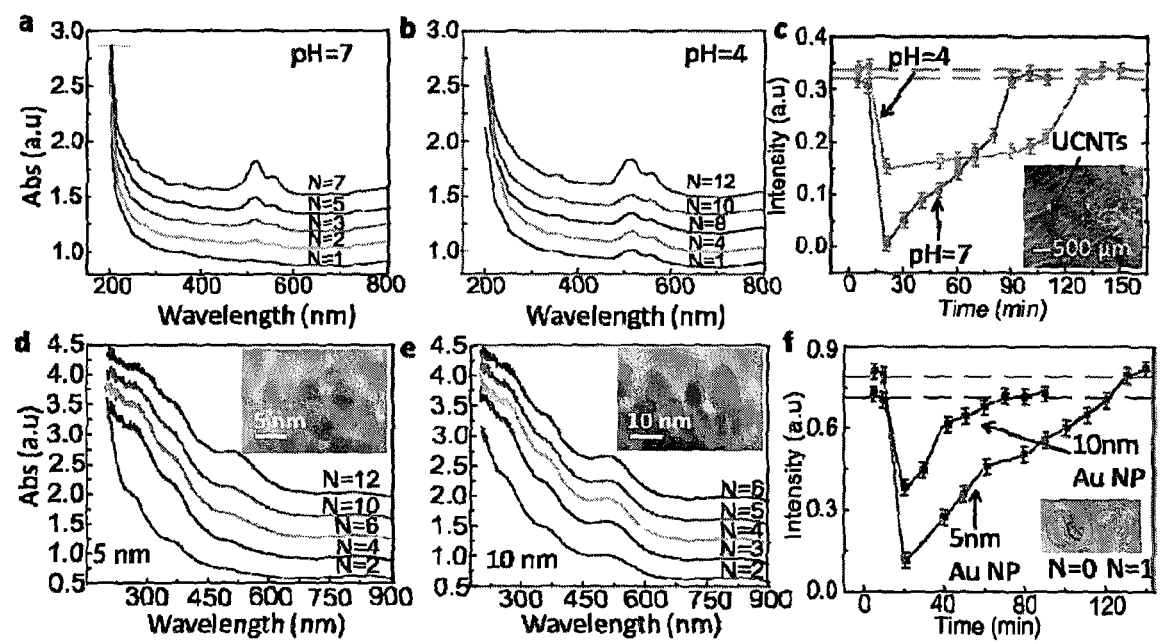
FIG. 12 shows the removal of rhodamine dextran (RD) and gold nanoparticles by UCNT-MCE membrane according to an embodiment of the present invention. a and b show the adsorption spectra of 100-μL aliquots collected sequentially during filtration of the RD solutions at pH=7 and 4 respectively. c, Adsorption intensity of filtered RD solutions at 514 nm. Inset in c is the microscopic florescence image of the membrane after 50 min filtration. d and e are the adsorption spectra of the solutions containing gold NPs at a diameter of 5 and 10 nm respectively. Insets in d and e are the TEM images of gold NPs adsorbed on the corresponding membranes after 50 min filtration. f, Adsorption intensity of filtered solutions of gold NPs at 521 nm. Inset in f shows the photos of water dispersed with 5 nm gold NPs before and after filtration (the first aliquot). The color changed from red to transparent, indicating that almost all the nanoparticles were removed by the UCNT membrane. N denotes the aliquot number.

FIGS. 12*a* and 12*b* show the adsorption spectra of water with RDatpH=7 and 4 respectively. It is observed that the intensity of both spectra first decreased, and then increased gradually as the filtration progressed. This property is more clearly shown by the adsorption measurements taken at 514 nm. As shown in FIG. 12*c*, the peak intensity (i.e., ~514 nm) of filtered solution decreased sharply in the first few aliquots; it then recovered to the value of fresh RD solution at longer times. Fluorescence microscopic analysis of the membranes revealed that the UCNTs were fully covered with RD molecules after filtration (inset in FIG. 12*c*). Arguably, the adsorption capability was stabilized in a slower manner in RDsolution at pH=4 (FIG. 12*c*), suggesting that the charge on the molecules may also play a role in the interactions with the UCNTs.

The plasma modified UCNT-MCE membrane is also capable of removing heavy metal nanoparticles. To demonstrate this, sample iv was again used to filter water dispersed with gold nanoparticles (NPs). FIGS. 12*d* and 12*e* show the optical absorbance of the filtered water with gold NPs at an average diameter of 5 and 10 nm, respectively. It is seen that both sized gold NPs were effectively removed. Gold NPs embedded in the UCNT networks were also observed by TEM images (insets in FIGS. 12*d* and 12*e*). FIG. 12*f* plots the peak intensity (at 521 nm) of water dispersed with gold NPs as the filtration progressed. The plots show that gold NPs with a smaller size can be removed more effectively than their larger counterparts. This result is contradictory to the size-selective mechanism commonly observed in many porous membranes, where the passage of small-sized nanoparticles is preferred. However, it is consistent with the proposed adsorptive mechanism. In the case of small-sized gold NPs, the interactions between the surface defective sites on the UCNTs and the NPs are substantially stronger[33], leading to higher retention efficiency. In contrast, the relatively weak interactions on larger gold NPs were less effective in retaining them[39].

5. Static Salt Adsorption by CNT-Based Membranes

To further verify, the high adsorption capacity of plasma modified UCNT-MCE membranes, we studied the adsorption behavior of the four types of membranes (i-iv, 1 cm² area) in static salt water (0.02 M or 1167 ppm NaCl). FIG. 13*a* shows the conductivity changes of the salt water as a function of the immersion time. By converting the conductivity changes to the mass of salt removed, the adsorption capacity of sample iv was found to be 590 μg with 160 μg of UCNTs immersed (FIG. 13*b*), which was the highest value among the four membranes. This result is in a good agreement with the 400% w/w specific adsorption observed in the micro-channel filtration experiments. In comparison, the pristine UCNT-based membrane (sample i) and the pure MCE membrane showed adsorption of <20 μg (inset of FIG. 13*b*). These results therefore confirmed that plasma treatment is essential for an enhanced salt adsorption of the UCNT-based membranes.

Figure 6:
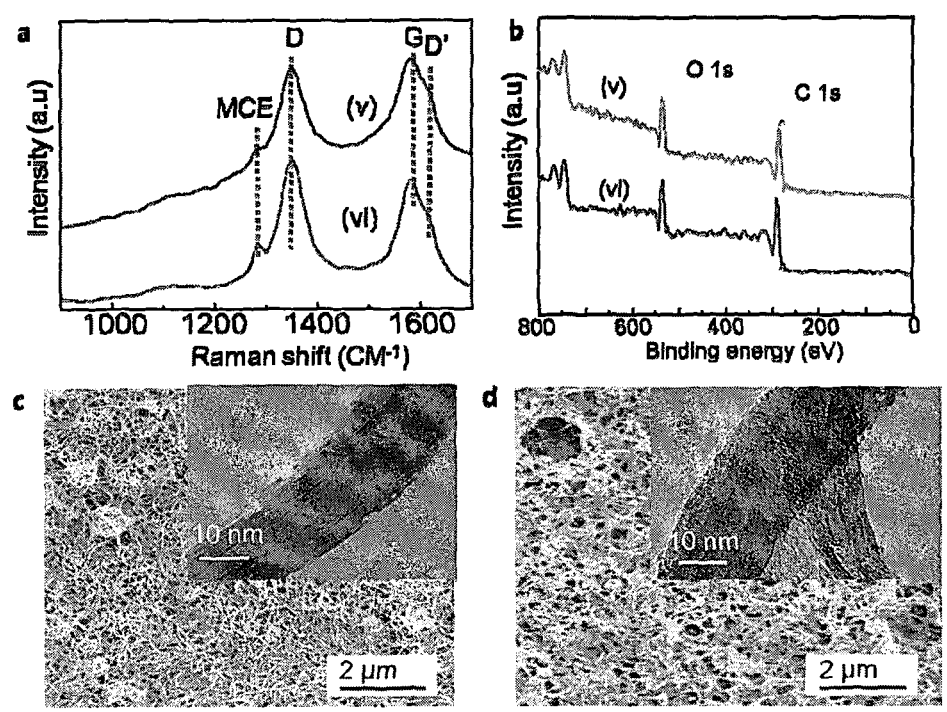
FIG. 6 shows a comparison of MWCNT/MCE membranes. a. The Raman and b, XPS spectra of (v) pristine and (vi) 10 min plasma modified MWCNT-based membranes. c and d are the SEM images of the pristine and 10 min plasma modified MWCNT-MCE membranes, respectively. Inserts in c and d show the corresponding TEM images of MWCNTs.
Figure 7:
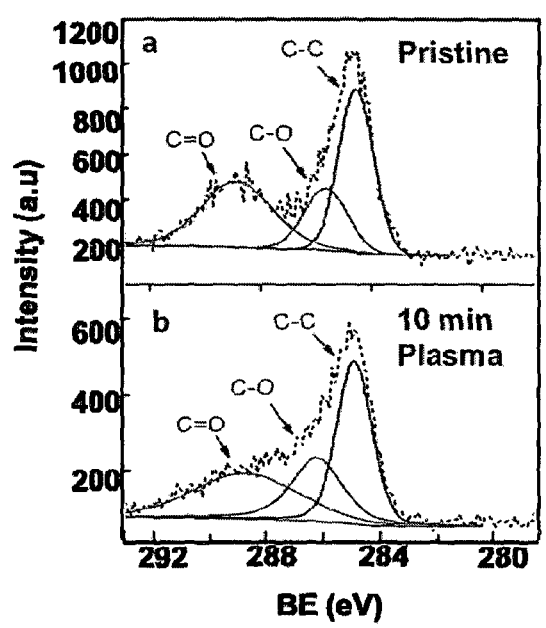
FIG. 7 shows a comparison of MWCNT/MCE membranes. a and b are the XPS C is spectra of pristine and 10 min plasma modified MWCNTs respectively. Three peaks corresponding to C—C, C—O, and C═O bonds can be resolved in all spectra. The portion of C—O and C═O peaks has not been increased significantly after plasma modification.

To demonstrate the critical role of UCNTs played in the adsorption, commercial multi-walled carbon nanotubes (MWCNTs) were also employed to construct the membranes using the same procedures. These MWCNTs had a FIG. 6). FIG. 13*b* shows the adsorption kinetic tests in static salt water, where samples v and vi represent the pristine and plasma modified short CNT-based membranes, respectively. It is found that both membranes exhibited a similar adsorption behavior with the same amount of salt removal of ~200 μg (inset of FIG. 13*b*). This adsorption capacity was higher than that of the pristine UCNT membranes, but was significantly lower than that of the plasma modified UCNT samples. Microscopic analyses indicated that in contrast to the UCNT layer, a much sparse structure of the top MWCNT layer was formed on the porous MCE support (FIG. 8). This is possibly due to the short length of MWCNTs, which provided insufficient van der Waals' forces to bundle them firmly[40] and were too short to form a layer similar to that of the much longer UCNTs. Furthermore, XPS spectra revealed that plasma was not so efficient in introducing defective sites on these MWCNTs (FIGS. 6 and 7). The sparse structure and the less defective sites could therefore be responsible for the moderate adsorption capacity observed on these short CNT-based membranes.

To further study the adsorption characteristics of the UCNTs, we synthesized 10 min plasma-treated UCNT-MCE membrane with different UCNT masses and immersed the samples in static salt water (0.02M or 1167 ppm NaCl). As shown in FIG. 13*c*, the specific adsorption results are in a close agreement with 400% w/w adsorption capacity. Next, we tested the adsorption capacity of 160 μg UCNT-MCE membrane in salt water at different concentrations. The removed salt as a function of the final solution conductivity fitted well to the Langmuir adsorption isotherm (FIG. 13*d*):

$$\theta = \frac{c/c_0}{1 + c/c_0} \quad (2)$$

where the $\theta$ is the mass of salt adsorbed normalized by the total salt adsorption capacity, c is the salt concentration, and $c_0$ is the Langmuir adsorption constant. This curve shows that the 10 min plasma treated UCNT-MCE membrane has a corresponding $c_0$ of ~250 ppm (4.3 mM), i.e., half the adsorption capacity of the UCNTs is attained at 250 ppm.

Knowing this value, we can estimate the interfacial energy change involved in salt adsorption. For precipitation of a thin layer of salt on a surface, the work of precipitation W is given by[41]

$$W = -nkT \ln(S) + \Delta\gamma n v_0/t \qquad (3)$$

where n is the number of salt molecules precipitated, S is the ratio of the actual activity of the salt to that of salt at saturation, $\Delta\gamma$ is the net change in interfacial energy per unit area, $v_0$ is the molecular volume, and t is the thickness of the precipitated crystal ($nv_0/t$ is the area). Assuming that the surface on which adsorption occurs is nearly covered when the salt concentration is 10 mM, setting the work of precipitation to zero at that concentration (i.e., assuming equilibrium) yields $\Delta\gamma \sim 0.025$ N/m for t=0.2 nm and $\Delta\gamma \sim 0.125$ N/m for t=1 nm. This order of magnitude of surface energy is within the range of known interfacial energies (e.g., surface energy of NaCl crystals is $\sim 0.4$ N/m)[42], suggesting that the observed Langmuir adsorption may be explained by the high surface energy of the plasma-treated UCNTs. The exact mechanism of the salt adsorption, namely the molecular structure of the adsorbed salt and to what extent it penetrates into the layers of the UCNTs to result in the remarkable adsorption capacity, presents an intriguing question that will require further investigations.

6. Discussion

The main criteria in the development of potable point-of-use water desalination systems include the cost, the efficiency, the usability, and the ability to simultaneously desalinate and purify contaminated water. In particular, one has to meet the economic and technical challenges in developing countries and resource-limited areas where clean water and sanitation are of most urgency. The feasibility of using such systems in remote areas without a continuous power supply is also practically important. To this end, we have demonstrated the high performance of plasma modified UCNT-based porous membranes in the removal of salt, organic molecules, and metal nanoparticles from low salinity solutions.

The ultrahigh specific adsorption capacity obtained on these UCNT-based membranes has been attributed to the large surface area of UCNTs and the plasma modification effects, which effectively introduced functional groups and defective sites in the outer layers of UCNTs. Due to the adsorption mechanism, the UCNT-based membranes have low pressure operation; the flow only serves to ensure a faster convection of salt to the UCNTs, where the salt adsorption process will be transport limited, and any flow or mixing will therefore increase the rate of adsorption. The UCNTs can simultaneously desalinate water and remove organic/inorganic contaminants, and the porous MCE membrane can filter out microbes. As compared to the currently-available water desalination techniques, the advantages of using the UCNT-based membranes with ultrahigh adsorption capability are obvious: RO membranes require pressure exceeding the osmotic pressure, and neither electrodialysis (ED) nor capacitive deionization (CDI) is suited for the removal of organic chemicals unless an, additional barrier is used. Hence, it is believed that the UCNT-based membranes will be promising in the next-generation low-cost and compact portable POU water desalination and purification devices that can meet the needs in developing countries and resource-limited areas.

Furthermore, RO systems are usually installed in a fixed location and the required operating equipment cannot be carried easily by a single person so that their mobility is limited. In contrast, the driving force for desalination of UCNT-based membranes is the free energy of adsorption and only a small pressure drop is required to provide sufficient water flux. The salt can even self-diffuse to the membrane and get absorbed, as demonstrated in the static adsorption tests. The pressure drop is much lower than that of the conventional RO technique at the same concentration of salt water. We anticipate that devices made from the UCNT membranes may operate as a rechargeable cartridge, similar to a battery: The devices could be carried on person to provide clean water, and recharged at a station where fresh water is available. For example, about 100 L of brackish water (10,000 ppm) could be purified by 250 g of the UCNTs. It is noted that point-of-use RO desalination systems have recently become available in the market; however, issues associated with the common RO membranes remain, i.e., low water flux, high energy and operational cost, and the inability to remove organics, pathogens, and heavy metal contaminants which are harmful to human[4,10]. The unique features possessed by the UCNT-based membranes are thus advantageous even as compared with the state-of-the art point-of-use RO systems.

Results of ultrahigh adsorption capability of UCNT-based membranes were mainly obtained from the low salinity water. Some practical issues may arise when one tries to extend the current studies to the desalination of real seawater. For example, seawater has complex ion makeups. In certain zeolite exchange-based desalination systems, the divalent ions (e.g., $Mg^{2+}$, $Ca^{2+}$) with higher charge densities might block sites for the monovalent ions when the systems allow them to enter the porous structure equally.[43] Further investigations are thus needed to elucidate whether the UCNT-based membranes are uniquely suited for other applications besides those discussed above.

In conclusion, we demonstrate that plasma-treated UCNTs display a remarkably high capacity for adsorption of salt. Plasma treatment causes severe structural damage to the outer layers of the UCNT that are subsequently functionalized with oxygen-containing groups, which, coupled with the high surface area of the UCNTs, likely results in the high salt adsorption. While desalination has been difficult to achieve using adsorptive materials, the UCNTs on porous MCE membranes could desalinate water, adsorbing up to 400% w/w of salt. This adsorption capacity was easily recovered by rinsing with tap water. Furthermore, the UCNTs could also adsorb organics and nanoparticles. Devices made using these membranes may be useful for POU purification of brackish water, operating like rechargeable cartridges. While the exact mechanism of salt adsorption is not understood, further studies may provide insight into design of materials with ultrahigh adsorption capacity for a variety of applications.

Whilst there has been described in the foregoing description preferred embodiments of the present invention, it will be understood by those skilled in the technology concerned that many variations or modifications in details of design or construction may be made without departing from the present invention.

REFERENCES

1. Semiat R. Energy issues in desalination processes. Environ. Sci. Technol. 42, 8193 (2008).
2. Service, R. F. Desalination freshens Up. Science 313, 1088 (2006).

3. Lee, K. P., Arnot, T. C. & Mattia, D. A review of reverse osmosis membrane materials for desalination-Development to date and future potential. *J. Membr. Sci.* 370, 1 (2011).
4. Misdan, N. et al. Seawater reverse osmosis (SWRO) desalination by thin-film composite membrane—current development, challenges and future prospects. *Desalination* 287, 228 (2012).
5. Shannon, M. A. et al. Science and technology for water purification in the coming decades. *Nature* 452, 301 (2008).
6. Elimelech, M. & Phillip, W. A. The future of seawater desalination: energy, technology, and the environment. *Science* 333, 712 (2011).
7. Lee, J. & Karnik, R. Desalination of water by vapor-phase transport through hydrophobic nanopores. *J. Appl. Phys.* 108, 044315 (2010).
8. Hillie, T. & Hlophe, M. Nanotechnology and the challenge of clean water. *Nat. Nanotech.* 2, 663 (2007).
9. Shannon, M. A. Water eesalination fresh for less. *Nat. Nanotech.* 5, 248 (2010).
10. Kim, S. J. et al. Direct seawater desalination by ion concentration polarization. *Nat. Nanotech.* 5, 297 (2010).
11. Aghakhani, A. et al. Application of some combined adsorbents to remove salinity parameters from drainage water. *Desalination* 275, 217 (2011).
12. Majumder, M. et al. Nanoscale hydrodynamics: enhanced flow in carbon nanotubes. *Nature* 438, 44 (2005).
13. Hummer, G., Rasaiah, J. C. & Noworyta, J. P. Water conduction through the hydrophobic channel of a carbon nanotube. *Nature* 414, 188 (2001).
14. Humplik, T. et al. Nanostructured materials for water desalination. *Nanotechnology* 22, 292001 (2011).
15. Savage, N. & Diallo, M. S. Nanomaterials and water purification: opportunities and challenges. *J. Nanoparticle Res.* 7, 331 (2005).
16. Holt, J. K. et al. Fast mass transport through sub-2-nanometer carbon nanotubes. *Science* 312, 1034 (2006).
17. Hinds, B. J. et al. Aligned multiwalled carbon nanotube membranes. *Science* 303, 62 (2004).
18. Fornasiero, F. et al. Ion exclusion by sub-2-nm carbon nanotube pores. *Proc. Nat. Acad. Sci. U.S.A.* 105, 17250 (2008).
19. Fornasiero, F. et al. PH-tunable ion selectivity in carbon nanotube pores. *Langmuir* 26, 14848 (2010).
20. Corry, B. Designing carbon nanotube membranes for efficient water desalination. *J. Phys. Chem. B* 112, 1427 (2008).
21. Corry, B. Water and ion transport through functionalised carbon nanotubes: implications for desalination technology. *Energy Environ. Sci.* 4, 751 (2011).
22. Pan, L. et al. Electrosorption of anions with carbon nanotube and nanofibre composite film electrodes. *Desalination* 244, 139 (2009).
23. Li, H. et al. Kinetics and thermodynamics study for electrosorption of NaCl onto carbon nanotubes and carbon nanofibers electrodes. *Chem. Phys. Lett.* 485, 161 (2010).
24. Porada, S. et al. Water desalination with wires. *J. Phys. Chem. Lett.* 3 (2012).
25. Wu, J. et al. Electrophoretically induced aqueous flow through single-walled carbon nanotube membranes. *Nat. Nanotech.* 7, 133 (2012).
26. Han, Z. J. et al. Time-dependent electrical double layer with blocking electrode. *Appl. Phys. Lett.* 94, 043118 (2009).
27. Dumee, L. et al. Enhanced durability and hydrophobicity of carbon nanotube bucky paper membranes in membrane distillation. *J. Memb. Sci* 376, 241 (2011)
28. Hata, K. et al. Water-assisted highly efficient synthesis of impurity-free single-walled carbon nanotubes. *Science* 306, 1362 (2004).
29. Han, Z. J. & Ostrikov, K. Uniform, dense arrays of vertically aligned, large-diameter single-walled carbon nanotubes. *J. Am. Chem. Soc.* 134, 6018 (2012).
30. Wu, Z. et al. Transparent, conductive carbon nanotube films. *Science* 305, 1273 (2004).
31. Dresselhaus, M. S. et al. Raman spectroscopy of carbon nanotubes. *Phys. Rep.* 409, 47 (2005).
32. Ostrikov, K. et al. Plasma nanoscience: setting directions, tackling grand challenges. *J. Phys. D: Appl. Phys.* 44, 174001 (2011).
33. Randeniya, L. K. et al. Ammonia sensing characteristics of carbon-nanotube yarns decorated with nanocrystalline gold. *Carbon* 49, 5265 (2011).
34. Tofighy, M. A. & Mohammadi, T. Salty water desalination using carbon nanotube sheets. *Desalination* 258, 182 (2010).
35. Porada, S. et al. Water desalination using capacitive eeionization with microporous carbon electrodes. *ACS Appl. Mater. Interfaces* 4, 1194 (2012).
36. Lei, W. et al. Porous boron nitride nanosheets for effective water cleaning. Nat. Comm. 4, 1777 (2013).
37. Li, Y. H. et al. Different morphologies of carbon nanotubes effect on the lead removal from aqueous solution. *Diamond Rel. Mater.* 15, 90 (2006).
38. Lu, C. & Liu, C. Removal of nickel(II) from aqueous solution by carbon nanotubes. J. Chem. Technol. *Biotechnol.* 81, 1932 (2006).
39. Li, H. et al. Enhanced transport of nanoparticles across a porous nanotube sponge. *Adv. Funct. Mater.* 21, 3439 (2011).
40. Sears, K. et al. Recent developments in carbon nanotube membranes for water purification and gas separation. *Mater.* 3, 127 (2010).
41. Kashchiev, D. & van Rosmalen, G. M. Review: nucleation in solutions revisited. *Cryst. Res. Tech.* 38, 555 (2003).
42. Lipsett, S. G. et al. The surface energy and the heat of solution of solid sodium chloride. *J. Am. Chem. Soc.* 49, 925 (1927).
43. Zhu, B. et al. Duke investigation of the effects of ion and water interaction on structure and chemistry of silicalite MFI type zeolite for its potential use as a seawater desalination membrane. *J. Mater. Chem.* 20, 4675 (2010)

The invention claimed is:

1. A membrane comprising a fibrous substrate and carbon nanotubes formed on a fibrous substrate, the carbon nanotubes having a surface modified by an ion beam plasma generated with argon, wherein the modified surface includes a surface roughness, and displays a Raman spectra D speak intensity to G peak intensity ration ($I_D/I_G$) greater than 0.8.

2. The membrane according to claim 1, wherein the fibrous substrate is a mixed cellulose ester porous membrane.

3. The membrane according to claim 1, wherein the carbon nanotubes are multi-walled carbon nanotubes.

4. The membrane according to claim 1, wherein the height of the carbon nanotubes are between 100 to 200 μm.

5. The membrane according to claim 1, wherein the diameter of the carbon nanotubes are between 10 to 20 nm.

6. The membrane according to claim 1, wherein the carbon nanotubes have a wall number of between 5 to 10.

7. The membrane according to claim 1, wherein the volume density of the carbon nanotubes on the fibrous substrate is 0.8 g/cm$^3$.

8. The membrane according to claim 1, wherein the porosity of the membrane is 60%.

9. A microfluidic device comprising a membrane according to claim 1.

10. A water filtration method, comprising passing water through the membrane according to claim 1 to filter the water.

11. The water filtration method of claim 10, wherein the filtration method comprises a reverse osmosis desalination method, a nanofiltration method, or an ultrafiltration method.

12. The membrane according to claim 1, wherein the $I_D/I_G$ peak intensity ration is about 1.26.

\* \* \* \* \*